United States Patent [19]

Tseng

[11] Patent Number: 5,692,958
[45] Date of Patent: Dec. 2, 1997

[54] DAMPING MECHANISM OF DRIVING SHAFTS

[76] Inventor: Chin Fu Tseng, No. 341, Chang Tsun Road, Taoyuan City, Taiwan

[21] Appl. No.: 752,281

[22] Filed: Nov. 19, 1996

[51] Int. Cl.⁶ ..................................................... F16D 3/78
[52] U.S. Cl. ............................................................ 464/93
[58] Field of Search ............................ 464/92, 93, 87, 464/71, 98, 147, 160, 180, 182

[56] References Cited

U.S. PATENT DOCUMENTS

| | | | |
|---|---|---|---|
| 4,114,472 | 9/1978 | Hornig et al. | 464/93 X |
| 4,188,802 | 2/1980 | Zeidler et al. | 464/93 X |
| 4,380,442 | 4/1983 | Amsel | 464/93 |
| 4,738,650 | 4/1988 | Hojo et al. | 464/93 X |
| 4,790,794 | 12/1988 | Takeda et al. | 464/93 |
| 5,205,788 | 4/1993 | Sacher et al. | 464/160 X |
| 5,545,089 | 8/1996 | Kirschey | 464/160 X |
| 5,561,545 | 10/1996 | Wahling et al. | 464/93 |

FOREIGN PATENT DOCUMENTS 321999  11/1929  United Kingdom ..................... 464/93

*Primary Examiner*—Daniel P. Stodola
*Assistant Examiner*—Eileen A. Dunn
*Attorney, Agent, or Firm*—Morton J. Rosenberg; David I. Klein

[57] ABSTRACT

A damping mechanism used in a driving shaft. Some metal sleeves that enclose tubes having annular flanges on the two ends thereof so that when the damping mechanism withstands an external impact the metal sleeve can only have a limited deflection, therefore preventing damage to the damping mechanism. Thus the damping mechanism has the advantage of a prolonged service life.

1 Claim, 4 Drawing Sheets

DAMPING MECHANISM OF DRIVING SHAFTS

BACKGROUND OF THE INVENTION

When vehicles run on a road, its driving shafts might endure continuous vibration and torsion so that it must have a damping mechanism (1) arranged between two shafts to absorb external impacts. As shown in FIGS. 1 and 2, the conventional damping mechanism (1), constructed by a high density rubber material, houses six tubes (11) each of which accommodates a rod (12). The damping mechanism can obtain a buffering and damping effect while the driving shaft runs. However, the conventional damping construction only uses a rubber material surrounding the tubes (11). When a violent vibration happens it is possible that the deflection exceeds the strength of material so that the rubber breaks. As a result the damping mechanism (1) loses its functions. Especially the condition is getting worse as the material ages.

In view of the above drawbacks of a conventional driving shaft, the object of the invention is to provide an improved damping mechanism that has less possibility of being damaged. Now the structural features of the damping mechanism according to the invention will be described in detail with reference to the accompanying drawings.

BRIEF DESCRIPTION OF THE ACCOMPANYING DRAWINGS

DETAILED DESCRIPTION OF PREFERRED EMBODIMENTS

Figure 1:
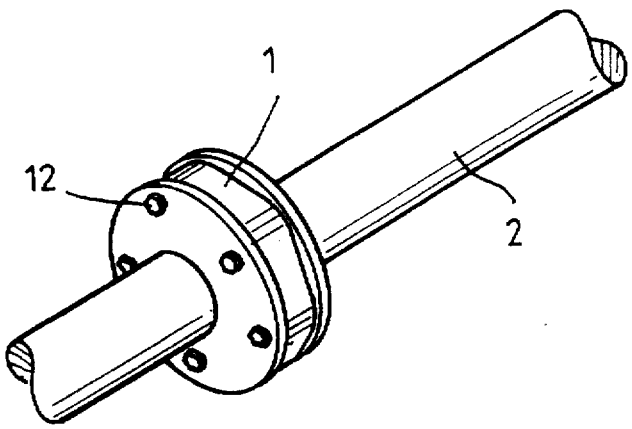
FIG. 1 is a perspective view of a driving shaft coupled with a damping mechanism.
Figure 2:
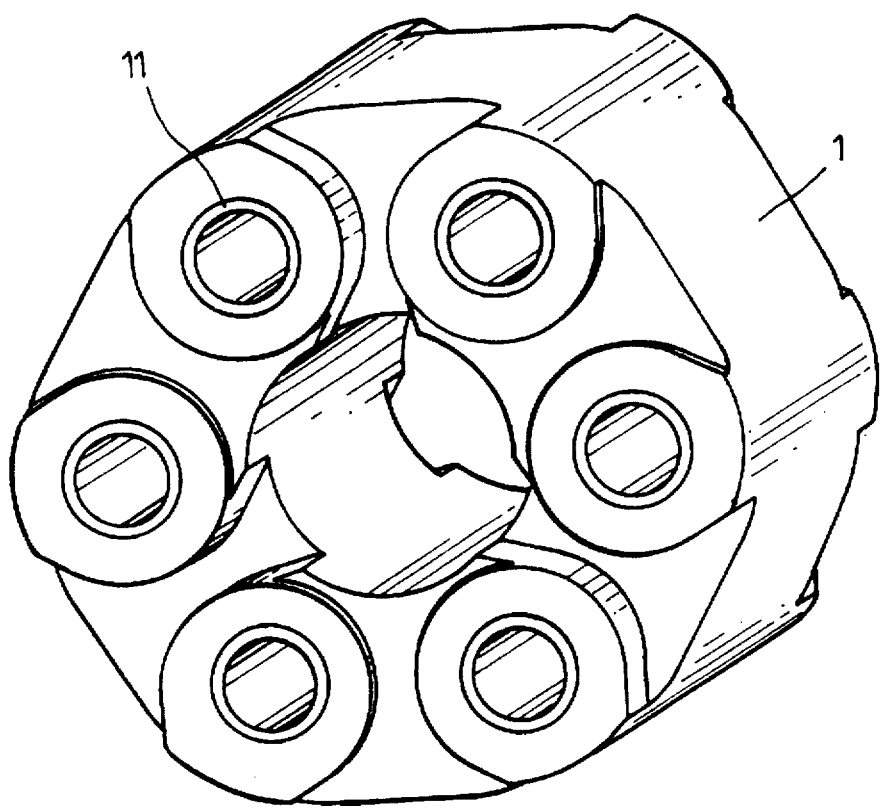
FIG. 2 shows perspectively a conventional damping mechanism.
Figure 3:
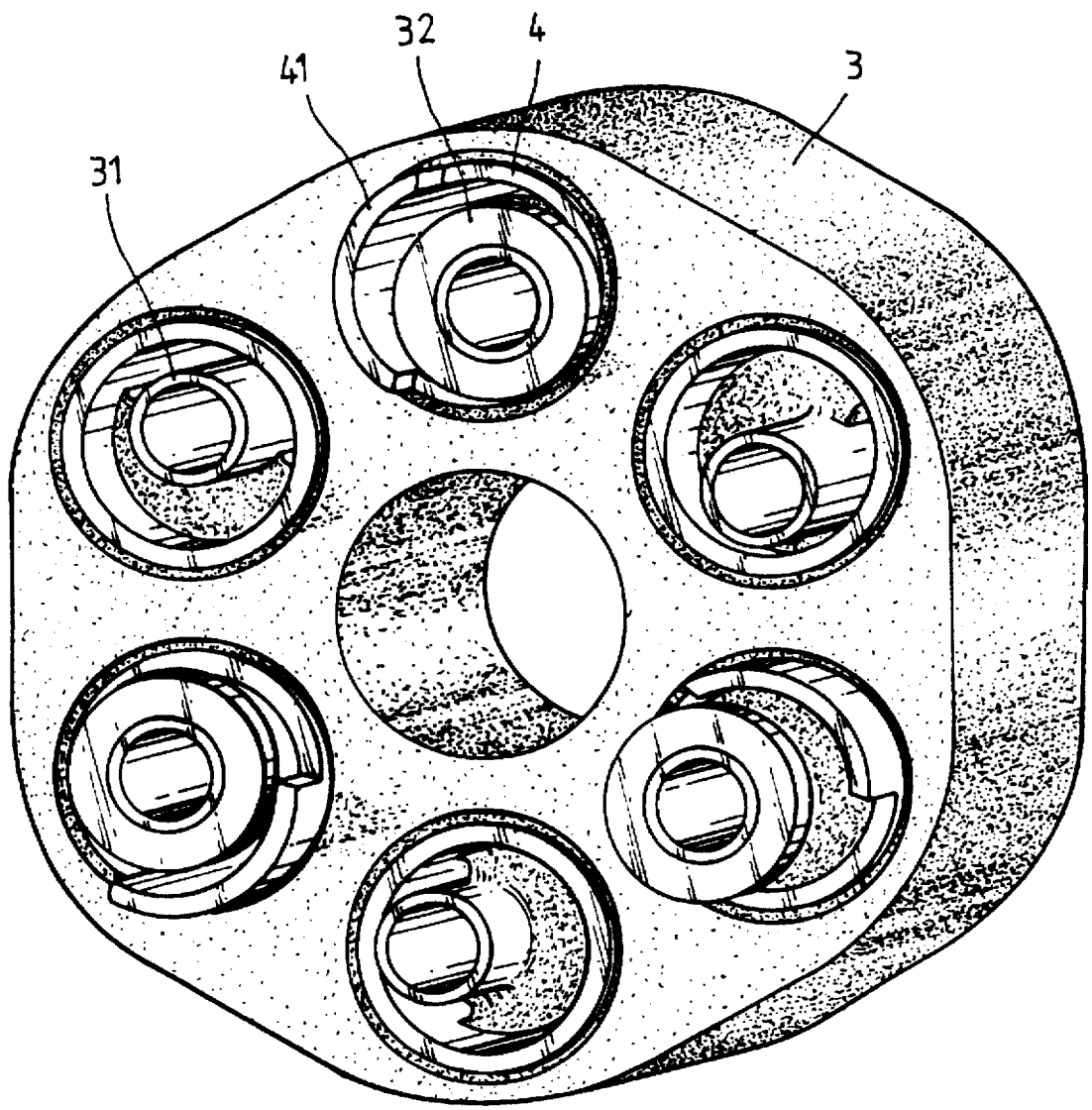
FIG. 3 shows a damping mechanism according to the invention.
Figure 4:
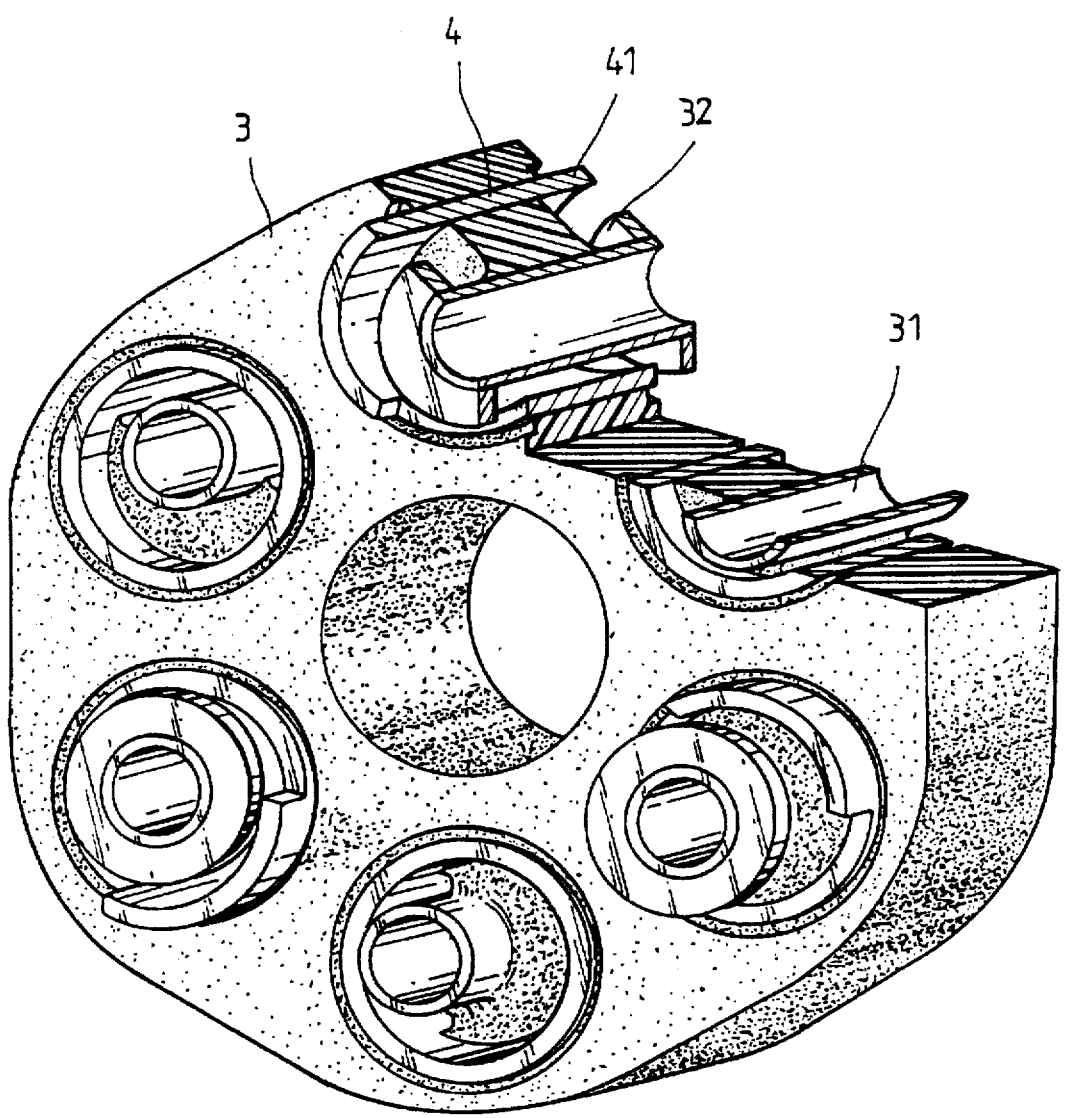
FIG. 4 shows the damping mechanism of FIG. 3 of which a portion has been cut off to reveal the internal structure.

An embodiment of this invention Will now be described by reference to the drawings. As shown in FIGS. 3 and 4, the improvements according to the invention have been made on the damping mechanism of a driving shaft. The inventive damping mechanism (3) is made of a high density rubber material and provided with six tubes (31) arranged in the axial direction. Some of the tubes (31) are further furnished with a disk-like flange (32) on two opposite ends thereof. In addition, the external cylindrical surface of each tube (31) is embraced by a metal sleeve (4) that has an inside diameter larger than the outer diameter of disk-like flanges (32). For each metal sleeve (4) that houses a tube (31) having disk-like flanges (32), an annular raised portion (41) is formed on the inside wall of the sleeve (4) at a location corresponding to the middle segment of the outer cylindrical surfaces of the tubes (31) so that when the tube (3) withstands an external force the raised portion (41) can restrain the tube from being deflected over a built-in limit.

Figure 5:
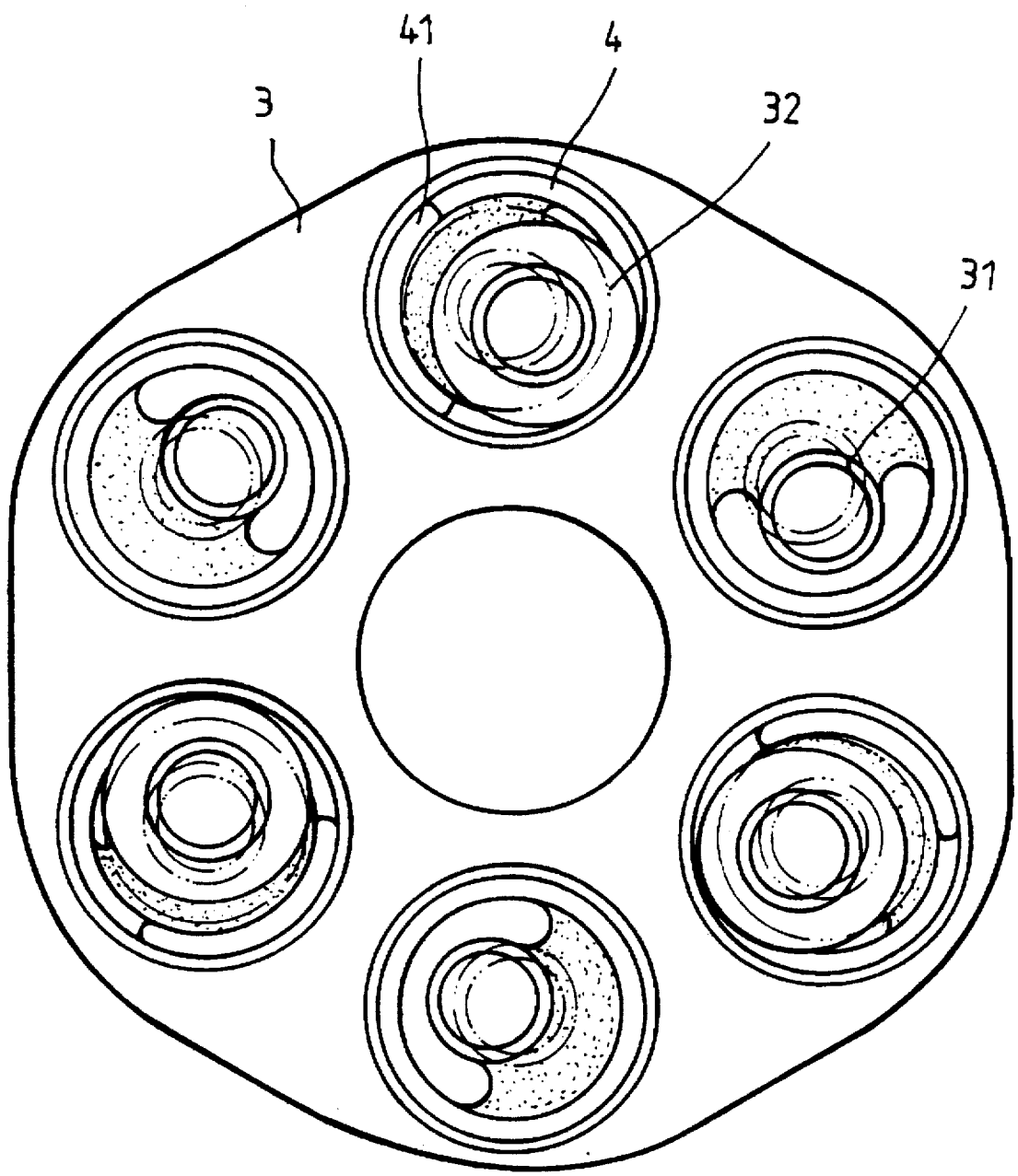
FIG. 5 illustrates the motions of metal sleeves as the damping mechanism takes a vibrating load.

In the embodiment illustrated in the accompanying drawings there is shown three sets of sleeves (4) having a raised portion (41). As can be best seen from FIG. 5, these raised portions (41) are oriented in such directions that the top surfaces of raised portions (41) make up a circle, by means of which the driving shaft can get supports no matter what directions it inclines. Thus it can prevent the driving shaft from being broken. The disk-like flanges (32) on the opposite ends of the tube (3) can respectively limit deflection angles of the driving shaft (2) in two reverse directions.

From the above description, evidently the invention uses improved damping mechanisms to absorb vibrations, which damping mechanisms have only limited deformation and thus can get rid of structural damages due to violent impacts. Therefore, the invention has the advantage of a prolonged service life. It has the practical value for the industry.

What is claimed is:

1. A damping mechanism used for a driving shaft, comprising a high density rubber body disposed between driving shafts and enclosing tubes, and characterized in that some of said tubes have a disk-like flange formed on the two opposite ends thereof and each of said tubes is housed in a metal sleeve, each of said sleeves that enclose the tubes having the two end flanges being provided with a raised portion projecting from each end thereof and aligned with each end flange of the enclosed tube to limit the deflection of the flanges.

* * * * *